3 Sheets--Sheet 1.

J. C. BROWN, dec'd.
JULIA A. BROWN, Assignee.

Machine for Cutting Veneers.

No. 6,341. Reissued March 23, 1875.

WITNESSES:

Millard Farr.
F. M. Quimby.

INVENTOR.

Julia A. Brown
assignee
Per Edw. E. Quimby
atty

3 Sheets--Sheet 2.

J. C. BROWN, dec'd.
JULIA A. BROWN, Assignee.

Machine for Cutting Veneers.

No. 6,341. Reissued March 23, 1875.

WITNESSES:
Millard Farr.
F. M. Quimby.

INVENTOR.
Julia A. Brown
assignee
per Edw. E. Quimby
Atty.

J. C. BROWN, dec'd.
JULIA A. BROWN, Assignee.

Machine for Cutting Veneers.

No. 6,341. Reissued March 23, 1875.

WITNESSES
Millard Farr
F. M. Lumby

INVENTOR.
Julia A. Brown
Assignee
Per Edw. E. Lumby
Atty.

UNITED STATES PATENT OFFICE

JULIA A. BROWN, OF SOUTHFIELD, NEW YORK, ASSIGNEE, BY MESNE ASSIGNMENTS, OF JONATHAN C. BROWN, DECEASED.

IMPROVEMENT IN MACHINES FOR CUTTING VENEERS.

Specification forming part of Letters Patent No. 124,880, dated March 26, 1872; reissue No. 6,341, dated March 23, 1875; application filed January 9, 1874.

*To all whom it may concern:*

Be it known that JONATHAN C. BROWN, deceased, late of Nyack, New York, did invent certain Improvements in Machines for Cutting Veneers, of which the following is a specification:

This invention relates to machinery for cutting veneers from compressed wood; and consists in a combination of devices for compressing the wood to a prescribed extent in a direction substantially at a right angle with the line of cut, at a point slightly in advance of a cutting instrument, governed by positive feeding mechanism, substantially as hereinafter described.

The devices, thus combined, in themselves are not new; but in their organization in this machine they operate in a novel manner to produce a new and useful result.

The invention is applicable to machines for cutting sheets of wood from either curved or flat surfaces; and its object is to effectually prevent the checking or splitting of such sheets during the cutting operation.

Figure 1:
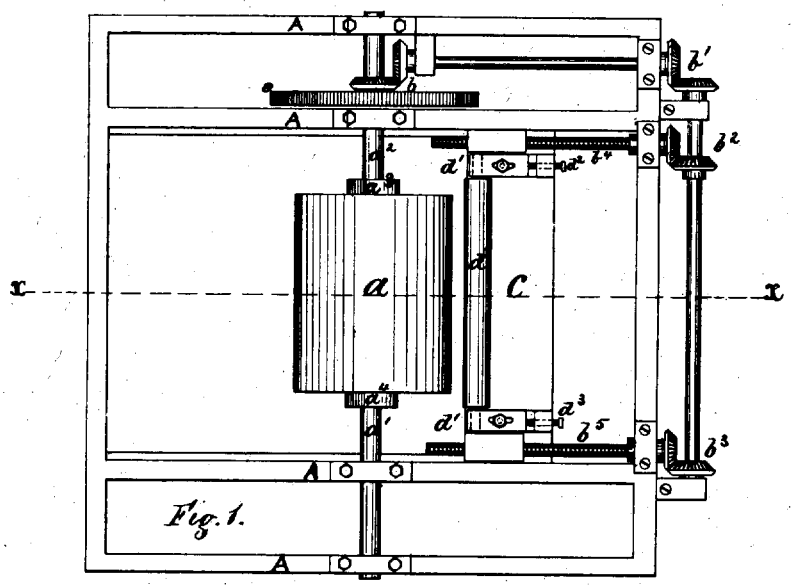
Figure 2:
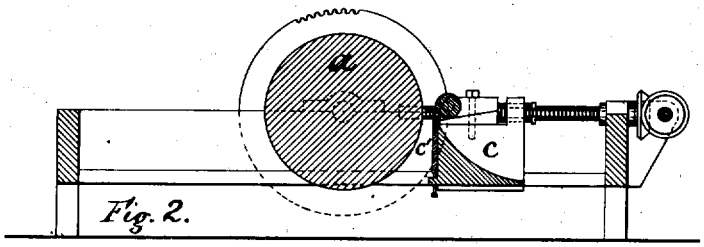
Figure 5:
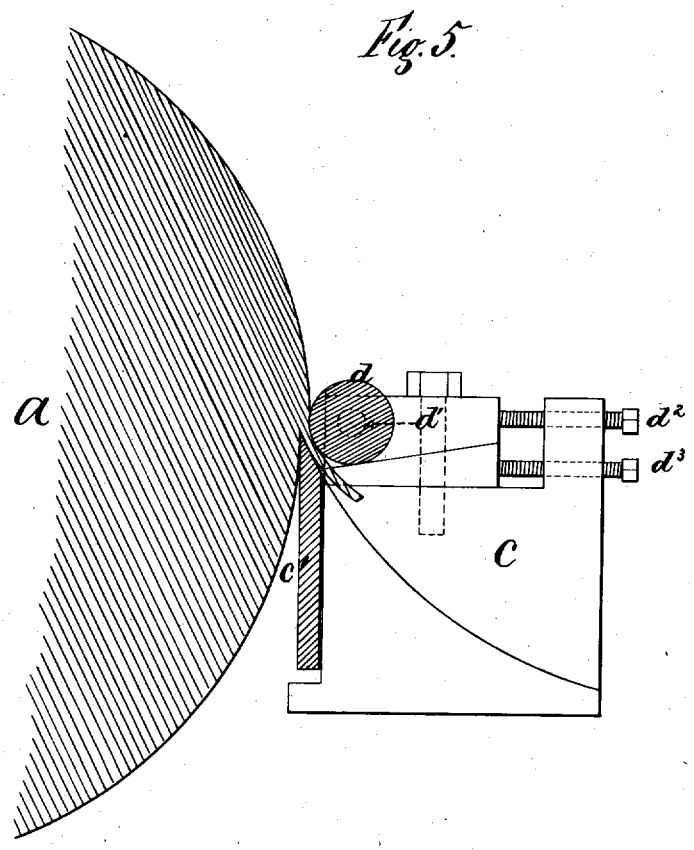

In the accompanying drawings, Sheets 1 and 3 represent the invention as applied to a machine for cutting sheets of wood from a cylindrical log. Figure 1 is a top view of the machine. Fig. 2 is a vertical sectional view through the line *x x* on Fig. 1; and Fig. 5, Sheet 3, is a vertical plane section on the line *x x*, exhibiting an enlarged view of the cutting instrument and compression-roller, showing the position they assume in operation.

Figure 3:
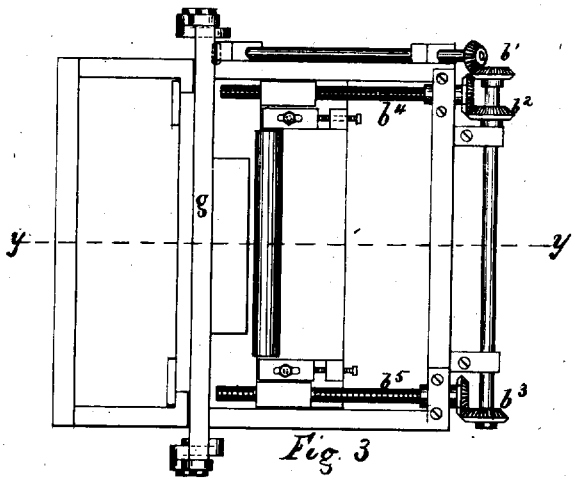
Figure 4:
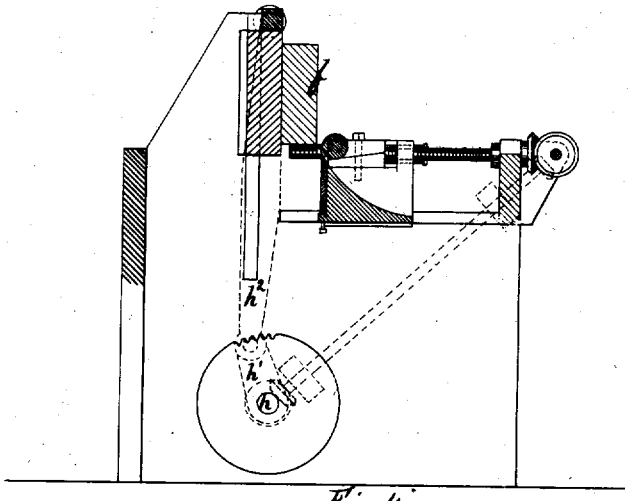

Sheet 2 represents the invention applied to a machine for cutting sheets of wood from a flat block. Fig. 3 is a top view of such machine, and Fig. 4 is a section in a vertical plane through the line *y y* on Fig. 3.

It will be seen, on reference to the drawings, that a cylinder of wood, *a*, is secured to the opposite faces of two revolving spindles, $a^1$ and $a^2$, having their bearings in the frame of the machine A, as shown. The faces of these spindles are dogs $a^3$ and $a^4$, for grappling into and holding the cylinder of wood *a* during the cutting operation. The power to revolve the cylinder of wood, or log, is applied to the gear *e*, which is applied to the spindle $a^2$. From the spindle $a^2$, by means of the miter-gears *b*, $b^1$, $b^2$, and $b^3$, and leading screw-bolts $b^4$ and $b^5$, a rectilinear motion is imparted to the sliding carriage or head-block *c*. The face of this head-block is armed with a chisel, *c'*, the width of which corresponds to the length of the cylinder of wood which is to be operated upon. Slightly above the level of the chisel-edge a roller, *d*, is mounted in substantial bearings $d^1$, arranged upon the head-block or carriage.

In operation, the head-block is adjusted so that the chisel cuts at the required depth, and the roller *d* is adjusted, by means of the set-screws $d^2$ and $d^3$, so as to embed itself to the desired extent in the periphery of the cylinder of wood *a*. As the cylinder *a* revolves, its periphery is compressed by the roller in a radial plane; and it will be seen that the cutting instrument or chisel *c'* is so arranged that the line of its cut is substantially at a right angle to the direction of the compression.

It is well known that machines have been used to cut veneers wherein a roller performed the functions of a regulator, which determined the depth of the cut.

It is also known that there have been machines for cutting veneers under pressure, in which were to be found a head-block and a cutting instrument, governed or fed by positively-acting mechanism; but in those machines the pressure was administered by stationary bars or throat-pieces, and the action of such stationary bars is different from the action of my compressing-roller in respect of the direction in which the fiber is upset.

In this machine the roller derives its motion from the revolving cylinder of wood, or from the moving surface of wood, upon which it is made to impinge in a prescribed degree by means of positively-operating set-screws. Thus there is an immediate engagement of the moving surface of wood and the periphery of the roller at the point of their initial contact, which results in effecting a prescribed compression of the fiber in a direction substantially across the line of cut. This positively-impinging rolling compressor, in combination with the cutting instrument and positively-acting feeding mechanism, as herein described, constitutes the invention.

Sheet No. 2 exhibits the invention applied to a machine for cutting sheets or laminæ from a flat block. In this case the block of wood *f* is secured to a carriage, *g*, having a reciprocating rectilinear motion, derived from the driving-shaft *h* by means of the crank $h^1$ and pitman $h^2$. In its downward movement the block *f* is presented to the chisel and compression-roller in the same relation that the cylinder is presented, so that sheets are cut from it without choking.

The only difference is that the block *f* moves in a right line instead of revolving, and the head-block is stationary during the cutting, and is fed up intermittently for each successive cut instead of being fed up at a regularly continuous rate of progression, as it is in cutting from a revolving log or cylinder of wood.

I claim as the invention of JONATHAN C. BROWN—

In a machine for cutting sheets of wood, a positively-impinging rolling compressor, as herein described, in combination with the cutting instrument and positively-acting feeding devices, substantially as described and specified.

JULIA A. BROWN.

Witnesses:
JULIUS R. POMEROY,
NATHL. A. PRENTISS.